United States Patent [19]
Nelson

[11] Patent Number: 5,350,509
[45] Date of Patent: Sep. 27, 1994

[54] DEEP WATER DISBURSEMENT TUBE

[76] Inventor: Robert L. Nelson, 1709 Moraga Way, Roseville, Calif. 95661

[21] Appl. No.: 154,072

[22] Filed: Nov. 18, 1993

[51] Int. Cl.$^5$ .............................................. B01F 1/00
[52] U.S. Cl. ................... 210/198.1; 210/206; 210/232; 422/275; 422/277
[58] Field of Search ............ 210/169, 198.1, 205, 210/206, 232; 15/1.7; 137/268; 422/276, 275, 277

[56] References Cited

U.S. PATENT DOCUMENTS

| | | | |
|---|---|---|---|
| Re. 28,313 | 1/1975 | Hostetter | 210/206 |
| 3,607,103 | 9/1971 | Kiefer | 422/277 |
| 3,684,460 | 8/1972 | Arneson | 210/169 |
| 3,758,276 | 9/1973 | Bond | 210/169 |
| 3,792,979 | 2/1974 | Clinton | 210/169 |
| 3,846,078 | 11/1974 | Brett | 210/169 |
| 4,252,773 | 2/1981 | Spiegel et al. | 210/169 |
| 4,420,394 | 12/1983 | Lewis | 210/169 |
| 4,473,533 | 9/1984 | Davey | 422/277 |
| 4,630,634 | 12/1986 | Sasaki et al. | 137/268 |
| 4,822,571 | 4/1989 | Nicholson et al. | 422/264 |
| 5,053,205 | 1/1991 | Taylor et al. | 210/169 |
| 5,055,183 | 10/1991 | Bucham | 210/169 |
| 5,124,032 | 6/1992 | Newhard | 210/169 |
| 5,197,158 | 3/1993 | Moini | 210/169 |
| 5,225,074 | 7/1993 | Moini | 210/169 |

*Primary Examiner*—Peter A. Hruskoci
*Assistant Examiner*—Robert James Popovics
*Attorney, Agent, or Firm*—Bert Williamson

[57] ABSTRACT

A water treatment device which is attached to the feed hose immediately above or behind deep water pool cleaner. Includes a cylindrical body that is slotted on either side within which a water treatment substance is housed. An outer cylindrical sleeve that rotates over the main cylindrical body is used to regulate the flow of water over the water treatment substance such that quiescent conditions prevail inside the holder. The device is equipped with buoyant end caps as to minimize impedance of pool cleaner to which is it attached. Provides distribution of dissolved water treatment substance throughout the entire body of water from the bottom up.

1 Claim, 1 Drawing Sheet

FIG. 2

DEEP WATER DISBURSEMENT TUBE

BACKGROUND—FIELD OF INVENTION

This invention relates to swimming pool chlorination, specifically to the distribution of chlorine through the use of a device attached to the automatic swimming pool cleaning system.

BACKGROUND—DESCRIPTION OF PRIOR ART

Pool water sanitation products have always been an important segment of the swimming pool industry. Sparkling, clean pool water is important to the owner's satisfaction and health as well as the overall appearance of the pool.

In the past, the emphasis seemed to be in developing new products that eliminated the use of chlorine such as with ionizers or ozone generators. Innate problems arose with these systems such as the lack of a residual being left in the water to sanitize the water after the filtration system turned off.

More recently, there has been a revitalized attempt to develop the old concepts of chlorine generation. This method involves extracting pure chlorine gas from sodium through the use of the low voltage current passing over a set of electrodes. The expense of these units, as well as the questionable performance, limits the marketability to the masses.

Widespread use of the floating chlorine tablet dispensers by most pool service companies has become the norm. Chlorine dispensers are the most maintenance free, "user friendly" method of sanitizing a swimming pool. However, the floating chlorine tablet dispenser dispenses the sanitizer at the "surface" of the pool. Circulation systems draw the majority of the water from the "surface" of the pool and return the filtered water back to the "surface" returns in the wall of the pool. This process unfortunately leaves a warm water stratified layer in the pool which prevents the disbursement of chlorine thoroughly throughout the entire body of water. This procedure was attempted in a different fashion by H. M. Arneson in the 1970's (U.S. Pat. No.3,684,460, dated Aug. 15, 1972). Mr. Arneson attached a dispensing tube beneath the floating pool cleaner. The chlorine was still displaced into the upper "surface" of the pool water.

OBJECTS AND ADVANTAGES

The DEEP WATER DISBURSEMENT TUBE is designed to attach to the feed hose of pool cleaners, such as the polaris and Jandy Rayvac, which travel from both top to bottom of the pools entire surface.

The sanitizer allows the natural mixing of the chlorine throughout the entire body of pool water, disbursing from the bottom up.

The tube is constructed of a light weight plastic material, semitransparent in clarity so as to reveal the status of undispensed chlorine and to minimize the impedance of the cleaner that it is attached to. It is tubular in shape and approximately two inches in diameter so as to allow the surrounding water to flow freely around the contained tablets. The length of the feeder is approximately twelve inches, which enables the feeder to contain enough tablets or sticks of chlorine to last a reasonable length of time without interfering with the flexibility of the feed hose.

Each side of the feeder is slotted to allow enough water to flow freely in and out of the feeder as to dispense the dissolved chlorine.

There is a secondary cylinder of which the inside dimensions match the outside dimensions of the feeder itself. This secondary cylinder rotates tightly enough to stay in the desired position to block-off portions of the slotted feeder tube. This enables the used to select the amount of dilution desired, depending upon the size of the pool, the water temperature, or the chlorine residual level desired.

Each end of the cap is fitted with a double wall cap with one and a half inches of air for buoyancy to eliminate any further impedance of the cleaner. One cap is permanently affixed in place, while the other is fitted with an "L" shaped slot with pins which hold the cap in place. The material of the caps is of the same chemical resistant light weight plastic used for the feeder tube itself and the secondary flow control tube.

The entire unit attached to the feed hose, immediately above or behind the cleaner, so as to minimize impedance. The unit is attached with plastic band clamps.

The unit itself does not need to be removed from the feed hose other than to possibly make repairs to the pool cleaner. The dispensing tube may be readily refilled by removing a cap at one end and then replacing the cap after refilling.

DESCRIPTION OF THE PREFERRED EMBODIMENTS

Figure 1:
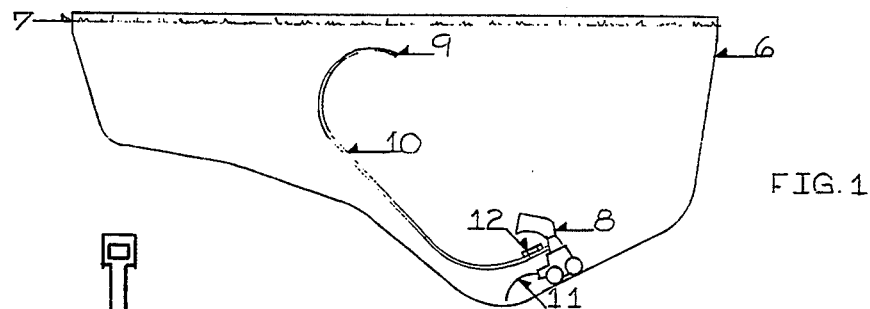
FIG. 1 is a side elevational view, in section, through a swimming pool equipped with an automatic swimming pool floor and wall cleaner to which a chlorinator is attached in accordance with the present invention.

Referring to FIG. 1, a swimming pool 6 is filled with water to a water level 7 and includes a floor and wall pool cleaner 8 connected to a source of vacuumed or pressurized water 9 via connecting hose 10.

The cleaner is so constructed as the water pressure causes the cleaner to travel both the floor and the walls of the pool, vacuuming the pool and further disbursing water through a trailing hose 11, helping to further distribute the dissolving chlorine being disbursed from the chlorine disbursement tube 12, attached to the connecting hose just above or behind the cleaner.

Figure 2:
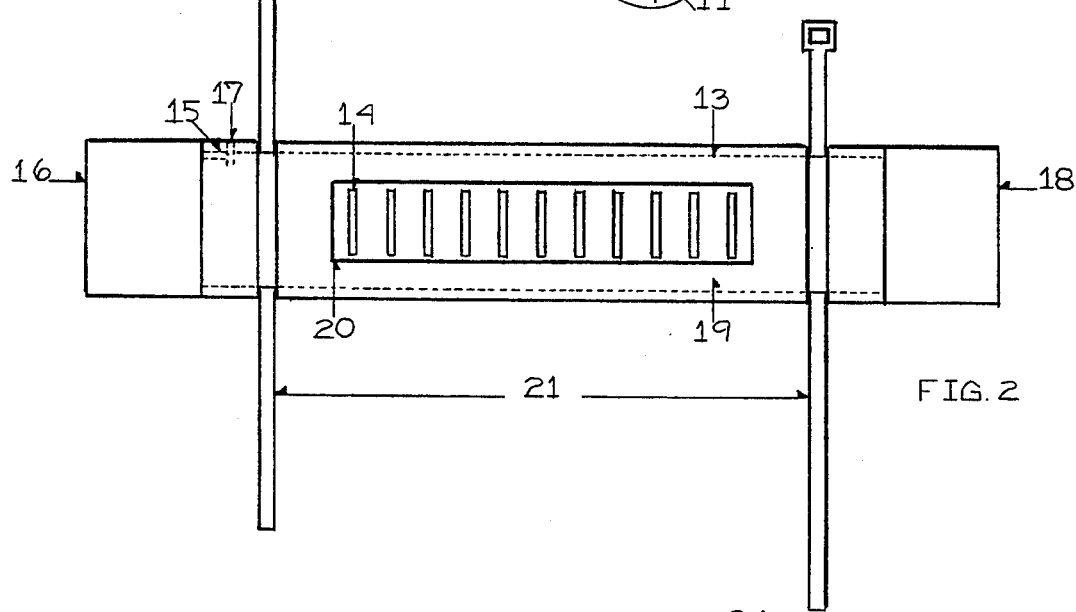
FIG. 2 is an enlarged side view of the fully assembled chlorine disbursement tube.

Referring to FIG. 2, is the completely assembled chlorine disbursement tube, consisting of the main body of the unit 13, which is slotted 14 to allow water to flow over the chlorine tablets which it contains. In addition, the main body is equipped with an "L" shaped slot is at one end so as to secure a removable cap 16 to one end of the tube. The removable cap is fitted with a pin 17 that slips into the "L" shaped slot of the main body and is secured by a slight turn. This removable cap has a double wall to allow an air chamber to provide buoyancy to the complete unit so as to eliminate any impedance to the cleaner. To the other end of the main body is a similar cap 18, with air chamber that is attached permanently.

The control tube 19 slides over the outside of the main body and is provided with oblong cutouts 20 to control water flow through the main body slots by rotating the control tube over the main body.

The completely assembled chlorine disbursement tube is then secured to the connecting hose at each end by plastic wire bundle straps 21.

Figure 3:
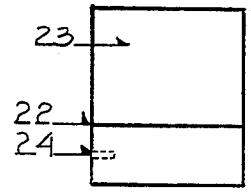
FIG. 3 is a side view of the removable cap that attaches to the main body of the chlorine disbursement tube.

Referring to FIG. 3 is a removable cap that attaches to one end of the main body of the chlorine disbursement tube. The cap is fitted with a permanent disc 22 providing an air chamber 23 for buoyancy. Affixed to the inner part of this cap is a pin 24 that slips into the "L" shaped slot of the main body of the disbursement tube to secure it in place.

Figure 4:
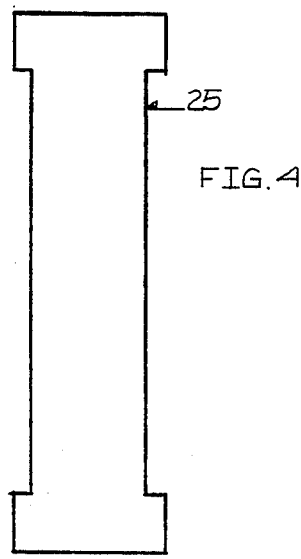
FIG. 4 is the exterior control tube that fits over the main body of the disbursement tube to control water flow over the encased chlorine tablets.

Referring to FIG. 4 is a side view of the outer control cylinder that fits securely over the main body of the disbursement tube and is provided with cutouts 25 to control the water flow through the main body and over the chlorine tablets contained within.

Figure 5:
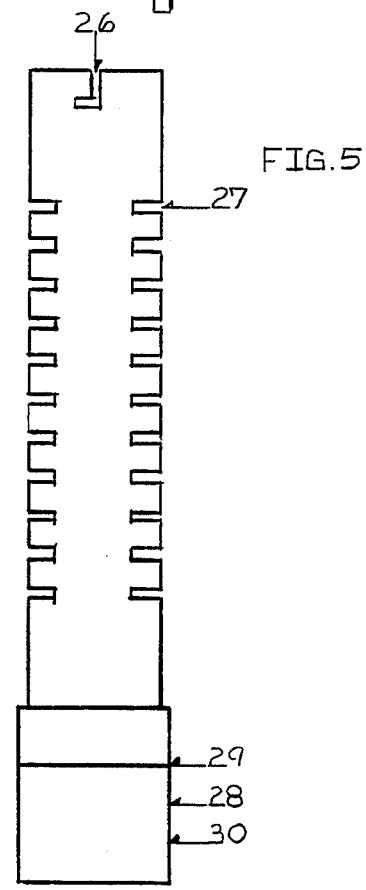
FIG. 5 is the main body of the chlorine disbursement tube with an attached permanent cap on the end.

Referring to FIG. 5 is a side view of the main body of the chlorine disbursement tube. At one end of an "L" shaped slot 26 is provided to attach the aforementioned removable cap to the main body. Slots 27 are provided on each side of the disbursement tube to allow water to flow over the chlorine tablets. At the opposite end of the removable cap is another cap 26 that is permanently affixed to the disbursement tube. This cap is also fitted with a permanent disc 29 so as to provide for an air chamber 30 for buoyancy.

SUMMARY, RAMIFICATIONS, SCOPE

The effect of the "DEEP WATER DISBURSEMENT" of the sanitizer would insure even distribution of the sanitizer, eliminating stratification of chlorine at the "surface", reduce chemical costs due to the more efficient method of distribution, and reduce the danger of small children playing with a more accessible floating dispenser.

I claim:

1. A dispensing apparatus for dispensing chemicals to purify the water in a swimming pool, said apparatus comprising:
    a semi-transparent, plastic, main body slotted on opposing sides to allow water to flow and contact an encased water purification material; said body having an "L"-shaped slot at one end and a permanent cap fitted on an opposite end, said cap having an air chamber defined by a permanent disc to provide buoyancy; and
    a semi-transparent, plastic, cylindrically shaped control tube with oblong slots, which fits over said main body to control the flow of water through the main body slots by rotating the control tube over the main body; and
    a removable cap fitted with a pin to engage said "L"-shaped slot, said removable cap having an air chamber defined by a permanent disc to provide buoyancy; and
    plastic straps for attachment of said apparatus to a hose.

* * * * *